United States Patent
Shinozaki (10) Patent No.: US 12,430,931 B2
(45) Date of Patent: Sep. 30, 2025

(54) ELECTRONIC DEVICE, INFORMATION PROCESSING APPARATUS, DEGREE-OF-CONCENTRATION CALCULATION PROGRAM, DEGREE-OF-CONCENTRATION CALCULATION METHOD, AND COMPUTER TRAINING METHOD

(71) Applicant: KYOCERA Corporation, Kyoto (JP)

(72) Inventor: Takayuki Shinozaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 261 days.

(21) Appl. No.: 18/255,547

(22) PCT Filed: Dec. 1, 2021

(86) PCT No.: PCT/JP2021/044156
§ 371 (c)(1),
(2) Date: Jun. 1, 2023

(87) PCT Pub. No.: WO2022/118899
PCT Pub. Date: Jun. 9, 2022

(65) Prior Publication Data
US 2024/0005676 A1    Jan. 4, 2024

(30) Foreign Application Priority Data
Dec. 3, 2020 (JP) ................ 2020-201108

(51) Int. Cl.
*G06V 20/59* (2022.01)
(52) U.S. Cl.
CPC ................ *G06V 20/597* (2022.01)

(58) Field of Classification Search
CPC ..... G06V 10/774; G06V 20/597; G06V 40/18
(Continued)

(56) References Cited

U.S. PATENT DOCUMENTS

2015/0339589 A1   11/2015  Fisher
2019/0304136 A1*  10/2019  Fukuda ............... G06T 7/73

FOREIGN PATENT DOCUMENTS

JP    2006-048171 A   2/2006
JP    2008-029802 A   2/2008

* cited by examiner

*Primary Examiner* — Kathleen M Walsh
(74) *Attorney, Agent, or Firm* — Studebaker Brackett PLLC (57) ABSTRACT

An electronic device 10 includes an image-capturing unit 11, a line-of-sight detector 12, and a controller 14. The controller 14 functions as a low-concentration heat map group estimator 15 and a high-concentration heat map estimator 16. The low-concentration heat map group estimator 15 can estimate a low-concentration heat map group based on an image. The high-concentration heat map estimator 16 can estimate a high-concentration heat map based on the image. The controller 14 calculates the degree of concentration of a subject based on the low-concentration heat map group, the high-concentration heat map, and a line of sight of the subject. The low-concentration heat map group estimator 15 is constructed using learning data obtained by machine learning the relationship between learning images and lines of sight for each load factor. The high-concentration heat map estimator 16 is constructed using learning data obtained by machine learning the relationship between learning images and lines of sight when the load has been removed or the load has been reduced.

8 Claims, 6 Drawing Sheets

(58) Field of Classification Search
USPC .......................................................... 348/148
See application file for complete search history.

ELECTRONIC DEVICE, INFORMATION PROCESSING APPARATUS, DEGREE-OF-CONCENTRATION CALCULATION PROGRAM, DEGREE-OF-CONCENTRATION CALCULATION METHOD, AND COMPUTER TRAINING METHOD

CROSS-REFERENCE TO RELATED APPLICATIONS

This application claims priority of Japanese Patent Application No. 2020-201108 filed in Japan on Dec. 3, 2020 and the entire disclosure of this application is hereby incorporated by reference.

TECHNICAL FIELD

The present disclosure relates to an electronic device, an information processing apparatus, a degree-of-concentration calculation program, a degree-of-concentration calculation method, and a computer training method.

BACKGROUND OF INVENTION

The attention of the driver is required for safe operation of a mobile object. Therefore, studies have been conducted on observing the driver's attention and issuing warnings to the driver or providing driving assistance when the driver's attention decreases. As a way of observing attention, a method has been proposed in which cumulative visibility, which is a cumulative value of the degree of overlap of the line of sight with an object such as an oncoming vehicle around the driver's own vehicle, is calculated and compared with a reference value (refer to Patent Literature 1).

CITATION LIST

Patent Literature

Patent Literature 1: International Publication No. 2008-029802

SUMMARY

In a First Aspect of the present disclosure, an electronic device includes an image-capturing unit, a line-of-sight detector, and a controller.

The image-capturing unit is configured to generate an image corresponding to a view by performing image capturing.

The line-of-sight detector is configured to detect a line of sight of a subject with respect to the view.

The controller is configured to estimate a degree of concentration of the subject based on the image and the line of sight.

The controller functions as a low-concentration heat map group estimator constructed based on learning data obtained by machine learning a relationship between a learning image and a line of sight to the learning image when a load that reduces concentration of a learning subject acts on the learning subject for each of multiple load factors and capable of estimating, based on the image, a low-concentration heat map group representing, for each of the load factors, a probability of the line of sight being at each position within the image when the load is acting.

The controller functions as a high-concentration heat map estimator constructed based on learning data obtained by machine learning a relationship between a learning image and a line of sight to the learning image when the load acting on the learning subject is removed or when the load is reduced and capable of estimating, based on the image, a high-concentration heat map representing a probability of the line of sight being at each position within the image when the load is removed or when the load is reduced.

The controller estimates a degree of concentration of the subject based on the low-concentration heat map group, the high-concentration heat map, and the line of sight of the subject.

In a Second Aspect, an information processing apparatus includes an acquiring unit, a controller, and an output unit.

The acquiring unit is configured to acquire an image corresponding to a view and a line of sight of a subject to the view.

The controller is configured to estimate a degree of concentration of the subject based on the image and the line of sight.

The output unit is configured to output the degree of concentration.

The controller functions as a low-concentration heat map group estimator constructed based on learning data obtained by machine learning a relationship between a learning image and a line of sight to the learning image when a load that reduces concentration of a learning subject acts on the learning subject for each of multiple load factors and capable of estimating, based on the image, a low-concentration heat map group representing, for each of the load factors, a probability of the line of sight being at each position within the image when the load is acting.

The controller functions as a high-concentration heat map estimator constructed based on learning data obtained by machine learning a relationship between a learning image and a line of sight to the learning image when the load acting on the learning subject is removed or when the load is reduced and capable of estimating, based on the image, a high-concentration heat map representing a probability of the line of sight being at each position within the image when the load is removed or when the load is reduced.

The controller estimates a degree of concentration of the subject based on the low-concentration heat map group, the high-concentration heat map, and the line of sight of the subject.

In a Third Aspect, a degree-of-concentration calculation program is configured to cause a computer to function as an image-capturing unit, a line-of-sight detector, and a controller.

The image-capturing unit is configured to generate an image corresponding to a view by performing image capturing.

The line-of-sight detector is configured to detect a line of sight of a subject with respect to the view.

The controller is configured to estimate a degree of concentration of the subject based on the image and the line of sight.

The controller functions as a low-concentration heat map group estimator constructed based on learning data obtained by machine learning a relationship between a learning image and a line of sight to the learning image when a load that reduces concentration of a learning subject acts on the learning subject for each of multiple load factors and capable of estimating, based on the image, a low-concentration heat map group representing, for each of the load factors, a probability of the line of sight being at each position within the image when the load is acting.

The controller functions as a high-concentration heat map estimator constructed based on learning data obtained by machine learning a relationship between a learning image and a line of sight to the learning image when the load acting on the learning subject is removed or when the load is reduced and capable of estimating, based on the image, a high-concentration heat map representing a probability of the line of sight being at each position within the image when the load is removed or when the load is reduced.

The controller estimates a degree of concentration of the subject based on the low-concentration heat map group, the high-concentration heat map, and the line of sight of the subject.

In a Fourth Aspect, a degree-of-concentration calculation method includes
  generating an image corresponding to a view by performing image capturing,
  detecting a line of sight of a subject to the view, and
  estimating a degree of concentration of the subject based on the image and the line of sight.

The estimating is constructed based on learning data obtained by machine learning a relationship between a learning image and a line of sight to the learning image when a load that reduces concentration of the learning subject acts on the learning subject for each of multiple load factors and is capable of estimating, based on the image, a low-concentration heat map group representing, for each of the load factors, a probability of the line of sight being at each position within the image when the load is acting.

The estimating is constructed based on learning data obtained by machine learning a relationship between a learning image and a line of sight to the learning image when the load acting on the learning subject is removed or when the load is reduced and is capable of estimating, based on the image, a high-concentration heat map representing the probability of the line of sight being at each position within the image when the load is removed or when the load is reduced.

The estimating estimates a degree of concentration of the subject based on the low-concentration heat map group, the high-concentration heat map, and the line of sight of the subject.

In a Fifth Aspect, a computer training method
  allows machine learning of a relationship between a learning image and a line of sight to the learning image when a load that reduces concentration of a learning subject acts on the learning subject for each of multiple load factors,
  allows machine learning of a relationship between a learning image and a line of sight to the learning image when the load acting on the learning subject is removed or when the load is reduced, and
  thereby allows estimation, based on an arbitrary image, of a low-concentration heat map group representing, for each of the multiple load factors, a probability of the line of sight being at each position within the image when the load is acting, and a high-concentration heat map representing a probability of the line of sight being at each position within the image when the load is removed.

DESCRIPTION OF EMBODIMENTS

Hereafter, electronic devices to which embodiments of the present disclosure have been applied will be described while referring to the drawings. The following description also serves as a description of an information processing apparatus, a degree-of-concentration calculation method, and a degree-of-concentration calculation program to which the present disclosure has been applied.

An electronic device according to a First Embodiment of the present disclosure is provided in a mobile object, for example. Examples of such mobile objects may include vehicles, ships, and aircraft. Vehicles may include, for example, automobiles, industrial vehicles, rail vehicles, motorhomes, and fixed-wing aircraft that taxi along runways. Automobiles may include, for example, passenger cars, trucks, buses, motorcycles, and trolleybuses. Industrial vehicles may include, for example, industrial vehicles used in agriculture and construction. Industrial vehicles may include, for example, forklift trucks and golf carts. Industrial vehicles used in agriculture may include, for example, tractors, cultivators, transplanters, binders, combine harvesters, and lawn mowers. Industrial vehicles used in construction may include, for example, bulldozers, scrapers, excavators, cranes, dump trucks, and road rollers. Vehicles may include vehicles that are human powered. The categories of vehicles are not limited to the above examples. For example, automobiles may include industrial vehicles that can travel along roads. The same vehicles may be included in multiple categories. Ships may include, for example, jet skis, boats, and tankers. Aircraft may include, for example, fixed-wing and rotary-wing aircraft.

Figure 1:
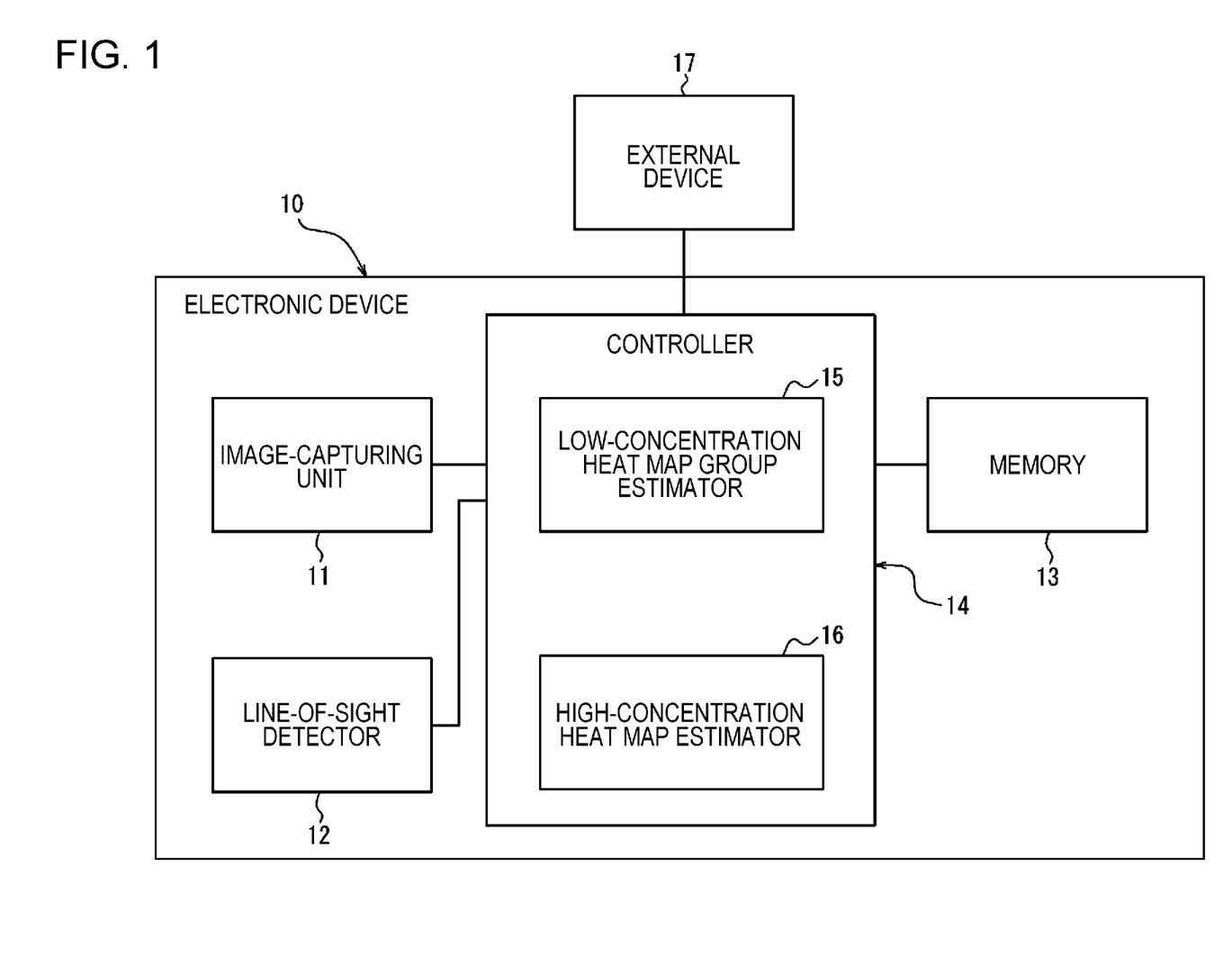
FIG. 1 is a block diagram illustrating the outline configuration of an electronic device according to a First Embodiment.

As illustrated in FIG. 1, an electronic device 10 according to the First Embodiment of the present disclosure includes an image-capturing unit 11, a line-of-sight detector 12, a memory 13, and a controller 14.

The image-capturing unit 11 is, for example, provided in a mobile object so as to be capable of capturing images of the view in the direction of movement of the mobile object. The image-capturing unit 11 is, for example, a camera capable of capturing images at a rate of 30 fps. The image-capturing unit 11 generates an image corresponding to the view by performing image capturing.

Figure 2:
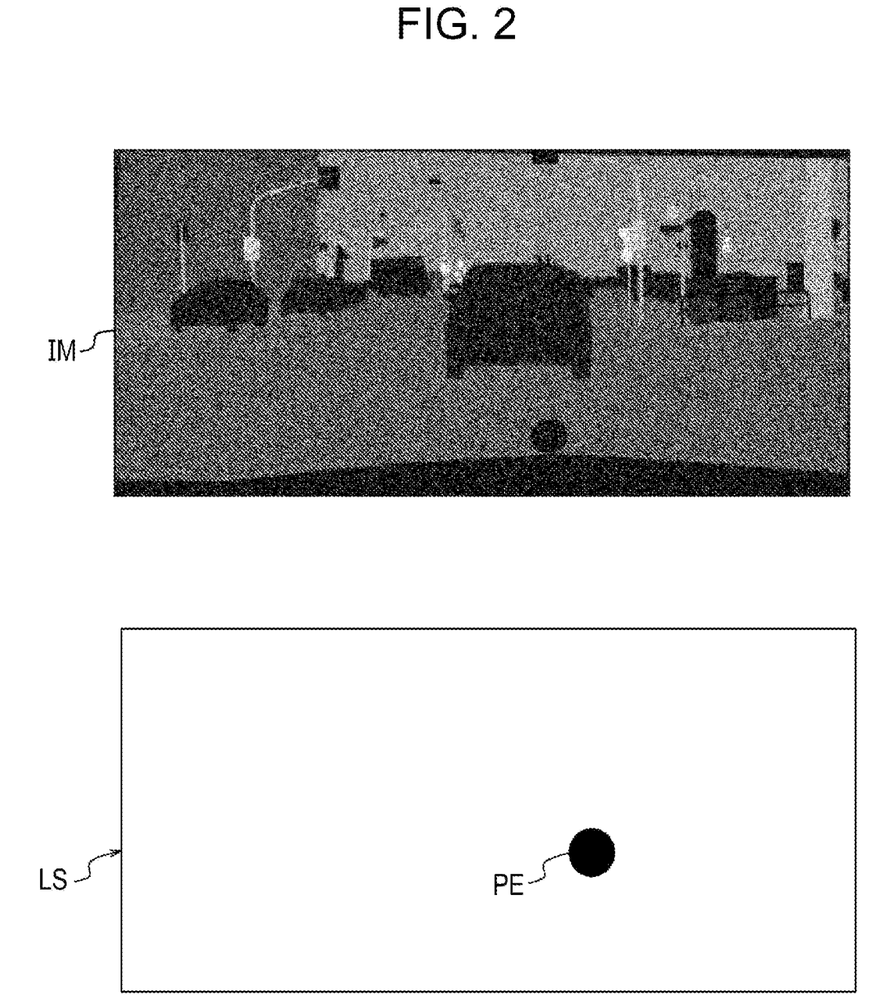
FIG. 2 is a diagram for describing the relationship between a line of sight detected by a line-of-sight detector and an image.

The line-of-sight detector 12 is, for example, provided in the mobile object so as to capable of detecting the line of sight of a subject sitting in the driver's seat of the mobile object. The line-of-sight detector 12 is, for example, either a contact-type eye tracker or a non-contact type eye tracker, and detects the line of sight of the subject with respect to the view. As illustrated in FIG. 2, a line of sight LS is, for example, illustrated as the direction of a line of sight LS corresponding to a position PE in the same coordinate system as an image IM generated by image capturing performed by the image-capturing unit 11.

The line-of-sight detector 12 may detect line-of-sight data by detecting a time series of the line of sight LS as line-of-sight data. More specifically, the line-of-sight detector 12 may detect a position PE of the line of sight LS on the image IM every time interval and output a time series of the positions PE of the line of sight LS as the line-of-sight data. The line-of-sight detector 12 may detect the line of sight LS at a higher rate, i.e., at a higher frequency than the image-capturing unit 11, and may accumulate a time series of the detected positions PE of the line of sight LS, and output the accumulated positions PE as a path of the line of sight LS in a single image IM.

The memory 13 includes any suitable storage device such as a random access memory (RAM) or a read only memory (ROM). The memory 13 stores various programs that allow the controller 14 to function and a variety of information used by the controller 14.

The controller 14 includes one or more processors and memories. Such processors may include general-purpose processors into which specific programs are loaded to perform specific functions, and dedicated processors dedicated to specific processing. Dedicated processors may include an application specific integrated circuit (ASIC). Processors may include programmable logic devices (PLDs). PLDs may include field-programmable gate arrays (FPGAs). The controller 14 may be either a system-on-a-chip (SoC) or a system in a package (SiP), in which one or more processors work together. The controller 14 controls operation of each component of the electronic device 10.

In normal operation, the controller 14 causes the image-capturing unit 11 to perform continuous image capturing at a rate of, for example, 30 fps and continuously acquires the images IM as information. The controller 14 causes the line-of-sight detector 12 to detect the line of sight LS of the subject while the image-capturing unit 11 is performing image capturing and acquires the line of sight LS in a time period substantially coinciding with the time point of capture of the image IM. The meaning of "a time period substantially coinciding with a time point of capture of the image IM" may include a single time point of detection or may include multiple time points of detection during the period from a time point of the image capture immediately preceding capture of the most recent image IM to a time point of the most recent capture of an image IM. In the case of a single time point of detection of the line of sight LS, the time period substantially coinciding with a time point of capture of the image IM does not need to include the exact time point, and the time period may include the time point closest to the time point of capture of the image IM in line of sight detection performed in the same period as the image capturing. The controller 14 associates the image IM and the line of sight LS detected in a period substantially coinciding with the time point of capture of the image IM and stores the associated image IM and line of sight LS in the memory 13.

The controller 14 may perform image processing on the acquired image IM. As described later, in a configuration where an estimator is trained using an image IM on which prescribed image processing has been performed, the controller 14 performs the prescribed image processing on an acquired image IM and stores the resulting image IM in association with the line of sight LS in the memory 13. The prescribed image processing may be, for example, processing for generating a semantic segmentation image based on the acquired image IM. A semantic segmentation image is an image in which a label or a category has been assigned to all pixels within the image IM.

The controller 14 estimates the degree of concentration of the subject based on an image IM and a line of sight LS, the line of sight LS being detected during a time period that substantially coincides with the time point of capture of the image IM. More specifically, the controller 14 estimates the degree of concentration of the subject by functioning as a low-concentration heat map group estimator 15 and a high-concentration heat map estimator 16.

The low-concentration heat map group estimator 15 estimates a first low-concentration heat map based on the image IM for a case where a load of a specific load factor acts on the subject. The low-concentration heat map group estimator 15 estimates a low-concentration heat map for each of multiple load factors. Multiple low-concentration heat maps, respectively corresponding to multiple load factors, constitute a low-concentration heat map group. Load factors are various factors that can negatively affect a typical subject's concentration while performing an activity such as driving, and include, for example, having a conversation with a passenger, conducting a hands-free conversation, listening to radio audio, contemplation, drowsiness, fatigue, and so on.

Figure 3:
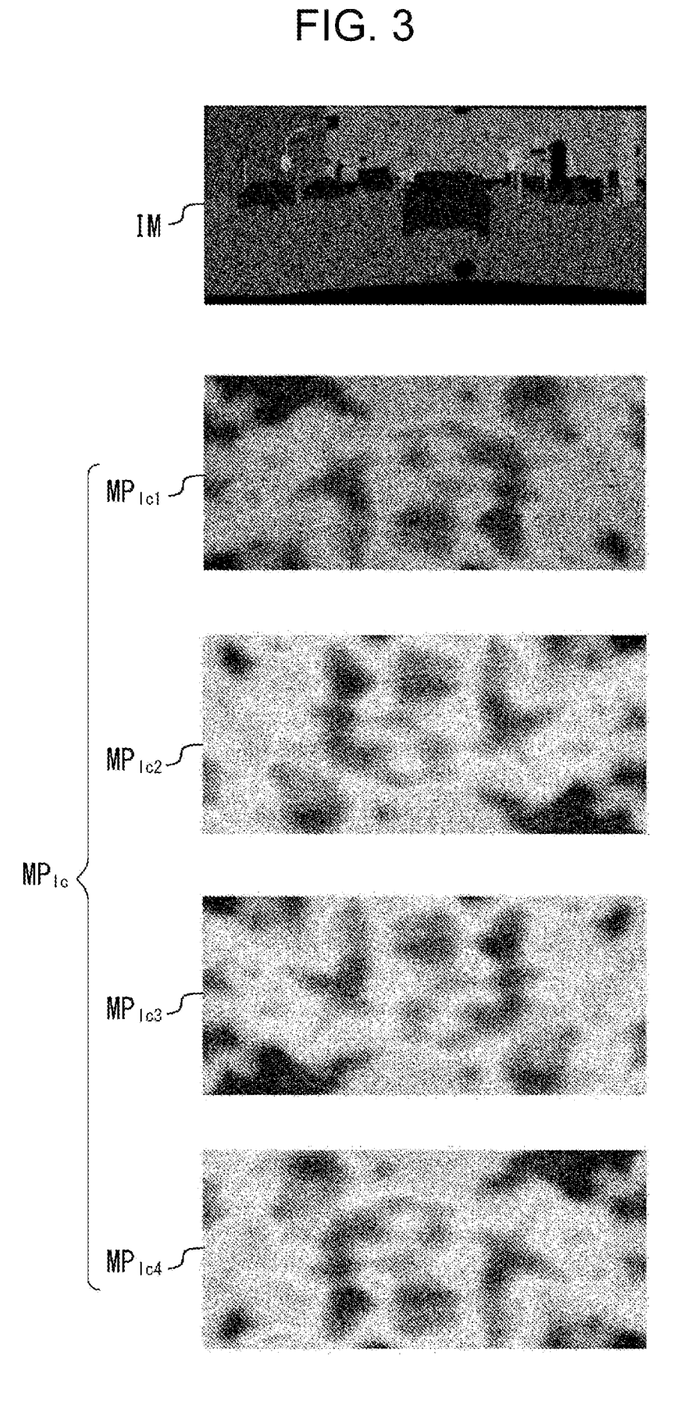
FIG. 3 is a diagram illustrating a specific example of a low-concentration heat map group estimated by a low-concentration heat map group estimator for an image.

As illustrated in FIG. 3, low-concentration heat maps $MP_{lc}$ care two-dimensional maps each representing the probability of a typical subject looking at each position in an image IM corresponding to a specific view, i.e., the probability of the line of sight being directed at that position, when the subject experiences the load of a specific load factor. In this embodiment, the low-concentration heat map $MP_{lc}$ includes a first low-concentration heat map $MP_{lc1}$ corresponding to contemplation, a second low-concentration heat map $MP_{lc2}$ corresponding to having a conversation with a passenger, a third low-concentration heat map $MP_{lc3}$ corresponding to drowsiness, and a fourth low-concentration heat map $MP_{lc4}$ corresponding to fatigue.

The high-concentration heat map estimator 16 estimates a high-concentration heat map based on an image IM for a case where all of the specific load factors acting on the subject have been removed. The high-concentration heat map is a two-dimensional map representing the probability of a typical subject looking at each position in an image IM corresponding to a specific view, i.e., the probability of the line of sight being directed at that position, when all load factors acting on the subject have been removed.

The low-concentration heat map group estimator 15 and the high-concentration heat map estimator 16 are constructing using a neural network having a multilayer structure, for example. The low-concentration heat map group estimator 15 and the high-concentration heat map estimator 16 are constructed by performing machine learning, as described below.

The controller 14 may estimate a single low-concentration heat map group based on multiple continuously captured images IM in a configuration in which the low-concentration heat map group estimator 15 is constructed via training using multiple continuously captured learning images, as described below. The controller 14 may estimate a single high-concentration heat map based on multiple images IM in a configuration in which the high-concentration heat map estimator 16 is constructed via training using multiple continuously captured learning images, as described below. The controller 14 may, for example, estimate a single low-concentration heat map group and a single high-concentration heat map based on images IM of frames within a prescribed time interval backwards in time from the most recent image IM.

The controller 14 may estimate a single low-concentration heat map group and a single high-concentration heat map by excluding images IM for which the speed of movement of the line of sight LS is at or above a threshold from among the multiple continuously captured images IM. More specifically, when the amount of movement of a line of sight LS at a particular detection time from the line of sight LS at the immediately previous detection time exceeds a threshold, the controller 14 may exclude the image IM associated with the detection time of the line of sight LS at that particular detection time. In other words, the controller 14 may exclude information during a saccade. The reason for excluding such information is that a saccade is an action that takes place during the process of moving to the next point that will be looked at, and the position PE of the line of sight LS during the saccade has no meaning as a point being looked at. The controller 14 may determine whether or not a saccade is occurring based on the speed of movement of the position PE of the line of sight LS.

The controller 14 calculates the degree of concentration of the subject based on the estimated low-concentration heat map group and high-concentration heat map and the line of sight LS of the subject, as described in an example below.

The controller 14 may read out the probability of the position PE corresponding to the line of sight LS of the subject in the first low-concentration heat map $MP_{lc1}$. Similar to the reading out of the probability in the first low-concentration heat map $MP_{lc1}$, the controller 14 may read out the probabilities of the position PE corresponding to the line of sight LS of the subject in the second low-concentration heat map $MP_{lc2}$, the third low-concentration heat map $MP_{lc3}$, the fourth low-concentration heat map $MP_{lc4}$, and the high-concentration heat map. Rather than reading out the probabilities, the controller 14 may instead calculate the average value of probabilities within a prescribed range based on the position PE of the line of sight LS of the subject and use the calculated average value instead of the probabilities in the description given below. The controller 14 may calculate an integrated value of probabilities along the path of the line of sight LS of the subject in multiple low-concentration heat maps $MP_{lc}$ included in a single low-concentration heat map group and a high-concentration heat map and this value may be used instead of a probability in the following description.

The controller 14 may select the heat map having the highest read-out probability from among the low-concentration heat map group and the high-concentration heat map. The controller 14 may calculate the degree of concentration based on a reference value defined for the selected heat map.

For example, a reference value may be defined within a degree of concentration range greater than or equal to 0% and less than 50% for all the low-concentration heat maps $MP_{lc}$ of the low-concentration heat map group. For example, a reference value may be defined within a degree of concentration range greater than or equal to 50% and less than or equal to 100% for the high-concentration heat map. If the heat map in which the probability of the position PE corresponding to the line of sight LS is highest is any of the low-concentration heat maps $MP_{lc}$, the controller 14 may calculate the reference value defined for the low-concentration heat map $MP_{lc}$ as the degree of concentration of the subject. If the heat map in which the probability of the position PE corresponding to the line of sight LS is highest is a low-concentration heat map $MP_{lc}$, the controller 14 may recognize the load factor corresponding to that low-concentration heat map. If the heat map in which the probability of the position PE corresponding to the line of sight LS is highest is the high-concentration heat map, the controller 14 may calculate the reference value defined for the high-concentration heat map as the degree of concentration of the subject.

The controller 14 may calculate the degree of concentration based on not only the type of heat map selected, but also based on the probability of the position PE corresponding to the line of sight LS in that heat map. For example, a function or table may be defined so that the degree of concentration is calculated as a smaller value as the probability increases in a low-concentration heat map $MP_{lc}$. Furthermore, for example, a function or table may be defined so that the degree of concentration is calculated as a larger value as the probability increases in the high-concentration heat map. The controller 14 may calculate the degree of concentration using a function or table defined for the selected heat map based on the probability of the position PE corresponding to the line of sight LS.

The controller 14 may calculate the degree of concentration based on the probability in the high-concentration heat map and the probability in the low-concentration heat map that has the highest probability in the low-concentration heat map group. The controller 14 may, for example, calculate the average of the reference value for the high-concentration heat map and the reference value for the low-concentration heat map $MP_{lc}$ having the highest probability, the reference values being weighted in accordance with their respective probabilities, as the degree of concentration.

The controller 14 may output the calculated degree of concentration to an external device 17. The external device 17 is a device that performs a prescribed operation based on the degree of concentration. The external device 17 is, for example, a warning device that alerts the subject when the degree of concentration is less than or equal to a warning threshold, a driving assistance device that assists the subject in driving the mobile object based on the degree of concentration, or a driving device that operates the mobile object based on the degree of concentration.

When the heat map in which the probability at the position PE corresponding to the line of sight LS of the subject is highest is a low-concentration heat map $MP_{lc}$, the controller 14 may output the load factor recognized as described above together with the degree of concentration.

The low-concentration heat map group estimator 15 is constructed using learning data obtained by machine learning the relationship between a learning image and the line of sight to the learning image when the learning subject is subjected to a load that reduces his or her concentration. The low-concentration heat map group estimator 15 is constructed using load-factor-specific learning data that is machine-learned for each of multiple load factors.

Learning images and lines of sight for the load of contemplation are collected, for example, by having the learning subject look at the learning images while performing the four arithmetic operations for single-digit numbers, for example. Learning images and lines of sight for the load of conversation with a passenger are collected, for example, by showing learning images while having the cooperator and the learning subject engage in daily conversation about climate, hobbies, health, and so forth. Learning images and lines of sight for the load of drowsiness are collected, for example, by having the learning subject look at the learning images 20 hours after waking. Alternatively, the learning images and lines of sight for the load of drowsiness are collected by showing the learning images to the learning subject while collecting biometric information on drowsiness, such as blink frequency and percentage of eyelid closure (PERCLOS), and selecting the learning images and lines of sight when the degree of concentration based on the biometric information corresponds to a state of inattention. Learning images and lines of sight for the load of fatigue are collected, for example, by showing learning images to the learning subject immediately after one hour of circuit training. Alternatively, the learning images and lines of sight for the load of fatigue are collected by showing the learning images to the learning subject while collecting biometric information on fatigue, such as heart rate and ECG, and selecting the learning images and lines of sight when the degree of fatigue based on the biometric information corresponds to a state of inattention.

The low-concentration heat map group estimator 15 estimates the probability of the line of sight LS being directed at each pixel or each region made up of multiple pixels constituting any image IM, based on the relationship between the learning image and the line of sight of the learning subject subjected to a specific load factor. The low-concentration heat map group estimator 15 generates a low-concentration heat map $MP_{lc}$ for each load factor, each low-concentration heat map $MP_{lc}$ representing in two-dimensional form the probability for each position in a particular image IM when a specific load factor is applied.

The low-concentration heat map group estimator 15 may further be constructed via machine learning of multiple continuously captured learning images and the actual lines of sight of the learning subject experiencing a specific load factor. More specifically, the low-concentration heat map group estimator 15 may estimate the probability of the line of sight LS being directed at each pixel or each region composed of multiple pixels constituting any image IM based on the position of the line of sight of a learning subject experiencing a specific load factor with respect to each of multiple continuously captured learning images. The low-concentration heat map group estimator 15 may be further constructed based on learning images and lines of sight where the speed of movement of the line of sight with respect to multiple continuously captured learning images is less than a threshold.

The high-concentration heat map estimator 16 is constructed using learning data obtained by machine learning the relationship between learning images and the lines of sight to the learning images when the load acting on the learning subject has been removed. The high-concentration heat map estimator 16 estimates the probability of the line of sight LS being directed at each pixel or each region made up of multiple pixels constituting any image IM, based on the relationship between the learning image and the line of sight LS of a learning subject for which the load has been removed or reduced. The high-concentration heat map estimator 16 generates a high-concentration heat map representing in two-dimensional form the probability for each position within a particular image IM when the load has been removed or the load has been reduced.

The high-concentration heat map estimator 16 may further be constructed via machine learning of multiple continuously captured learning images and the actual lines of sight of a learning subject for which the load has been removed or the load has been reduced. More specifically, the high-concentration heat map estimator 16 may estimate the probability of the line of sight LS being directed at each pixel or each region made up of multiple pixels constituting any image IM, based on the position of the line of sight of a learning subject for which the load has been removed or the load has been reduced for each of multiple continuously captured learning images. The high-concentration heat map estimator 16 may be further constructed based on learning images and lines of sight where the speed of movement of the line of sight with respect to multiple continuously captured learning images is less than a threshold.

The learning images and lines of sight may be collected using a load testing method as described below, for example. In a load test, the subject may be asked to drive a mobile object. The subject may be asked to drive through a specific section without a load, and then drive through the same section while being subjected to a load factor, which will be described later. Two consecutive runs consisting of a run without a load and a run with a load may be made, and the view in front of the mobile object may be collected as learning images and lines of sight as lines of sight to the learning images. The load used in the test may be any load within the range of behaviors that may occur while driving. High loads that are not expected to occur during driving need not be used as loads in the test. Loads that would require the line of sight to be moved away from the forward direction also do not need to be used in the test. This because a load that would require the user to remove their line of sight would be obviously dangerous, and therefore there is little need to use such a load to measure the degree of concentration.

Loads used in the load test may include single-digit arithmetic, conversation, listening to the radio, two-back arithmetic, drowsiness, and fatigue. In the load test, each of the example loads may be applied alone or a combination of multiple loads may be applied.

Single-digit arithmetic may be at least one out of single-digit addition and subtraction operations. The subject may be asked to perform single-digit arithmetic via a recorded voice. In single-digit arithmetic, if the subject is unable to answer in time, the next question may be asked. The view in the forward direction and the line of sight may be collected for learning when the percentage of correct answers to single-digit arithmetic is greater than or equal to a threshold. By limiting the percentage of correct answers to be greater than or equal to a threshold, lines of sight can be collected for a load that reduces the focus on recognition of the view due to the focus on arithmetic. Arithmetic involving two or more digits are not to be used for load testing since the load would be excessive.

Conversations may be conducted by the subject and a cooperator such as an operator, for example, on topics such as work, hobbies, and so on. For example, a program in which content such as a conversation is broadcast may be used for listening to the radio. Two-back arithmetic may be arithmetic in which, for single-digit numbers asked in succession, the answer is given for the number two numbers back. Two-back arithmetic for two-digit numbers and three-back arithmetic in which an answer is given for the number three numbers back are not be used for load testing because of how challenging the load would be. The load state of being drowsy may be a state in which the subject is aware of their drowsiness or a state in which the subject is identified as being drowsy based on general indicators of drowsiness, such as pupil size, degree of eyelid opening, and so on. The load state of being fatigued may be the state existing immediately after exercising.

Figure 4:
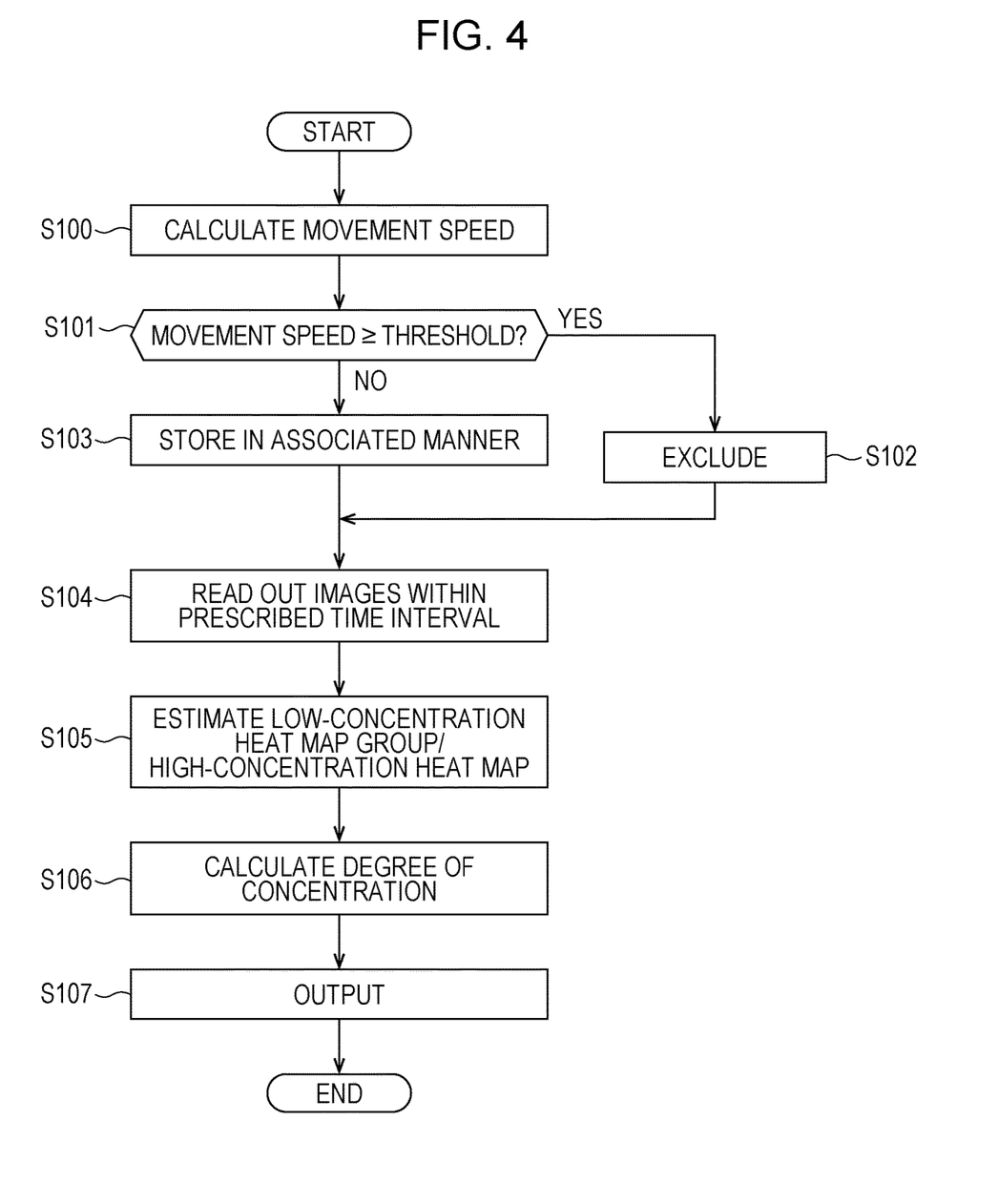
FIG. 4 is a flowchart for describing estimation processing performed by a controller in FIG. 1 in the First Embodiment.

Next, estimation processing executed by the controller 14 in the First Embodiment will be described using the flowchart in FIG. 4. The estimation processing starts whenever the controller 14 acquires an image IM of one frame and a line of sight LS.

In Step S100, the controller 14 calculates the movement speed of the acquired line of sight LS based on a comparison with a position PE of the line of sight LS acquired immediately previously. After the calculation, the process advances to Step S101.

In Step S101, the controller 14 determines whether the movement speed calculated in Step S101 is greater than or equal to a threshold. When the movement speed is greater than or equal to the threshold, the process advances to Step S102. When the movement speed is not greater than or equal to the threshold, the process advances to Step S103.

In Step S102, the controller 14 discards the image IM and the line of sight LS acquired at the start of the estimation processing. After the discarding, the process advances to Step S104.

In Step S103, the controller 14 stores the image IM and the line of sight LS acquired at the start of the estimation processing in the memory 13 in association with each other. After storing the data, the process advances to Step S104.

In Step S104, the controller 14 reads, from the memory 13, images IM in combinations of an image IM and a line of sight LS stored within a prescribed time interval backwards in time. After that, the process advances to Step S105.

In Step S105, the controller 14 estimates a single low-concentration heat map group and a single high-concentration heat map based on multiple images IM included in the combinations read out in Step S104. After the estimation, the process advances to Step S106.

In Step S106, the controller 14 selects the heat map in which the probability of the position PE corresponding to the line of sight LS is highest, based on the low-concentration heat map group and the high-concentration heat map estimated in Step S105 and the line of sight LS acquired at the start of the estimation processing. The controller 14 calculates a reference value defined for the selected heat map as the degree of concentration of the subject. After the calculation, the process advances to Step S107.

In Step S107, the controller 14 outputs the degree of concentration calculated in Step S106 to the external device 17. After the output, the estimation processing ends.

In the thus-configured electronic device 10 of the First Embodiment, the controller 14 functions as the low-concentration heat map group estimator 15 capable of estimating, based on the image TM, a low-concentration heat map group representing the probability of the line of sight LS being at each position within the image IM when a load is applied for each of multiple load factors, functions as the high-concentration heat map estimator 16 capable of estimating a high-concentration heat map representing the probability of the line of sight LS being at each position within the image TM when the load is removed, and estimates the degree of concentration of the subject based on the estimated low-concentration heat map group and the high-concentration heat map, and the line of sight LS. For example, the object being looked at and the direction of gaze generally vary for a variety of views, such as highways, urban areas, suburban areas, and residential areas. In addition, the objects people look at tend to vary with the type of load. Therefore, improving the accuracy with which the degree of concentration is estimated by simply detecting only movement of the line of sight LS is difficult. However, with the above-described configuration, since the electronic device 10 has already learned what objects people tend to look at for each of multiple load factors for a variety of views and what objects people tend to look at when the loads are removed, the electronic device 10 can estimate the degree of concentration with high accuracy based on an image IM and a line of sight LS corresponding to the view on that occasion. Since the attention of a person is affected by the degree of concentration, the electronic device 10 is capable of improving the accuracy with which the attention of a subject is estimated in various situations.

When the heat map in which the probability of the position PE corresponding to the line of sight LS of the subject is highest is one of the low-concentration heat maps MPI, of the low-concentration heat map group, the electronic device 10 of the First Embodiment outputs the load factor corresponding to that low-concentration heat map $MP_{lc}$ together with the degree of concentration. With this configuration, the electronic device 10 is able to provide useful information to the external device 17, which will be able to perform various operations based on the state of the subject.

The electronic device 10 of the First Embodiment calculates the degree of concentration of the subject based on multiple continuously captured images IM. With this configuration, the electronic device 10 has already learned lines of sight LS of people for various load factors or with no load for changing views, and therefore the electronic device 10 can calculate the degree of concentration with even greater accuracy based on the image IM corresponding to the changing view.

The electronic device 10 of the First Embodiment calculates the degree of concentration of the subject by excluding images TM, from among the continuously captured multiple images IM, for which the speed of movement of the line of sight LS exceeds a threshold. The object that the subject is looking at in the view is expected to be a factor that significantly affects the degree of concentration. Therefore, the line of sight LS is expected to have little effect on the degree of concentration during a rapid change in line of sight LS from one object to another object, such as during a saccade. Therefore, since the electronic device 10 having the configuration described above excludes images IM considered to have little effect on the degree of concentration, the electronic device 10 can calculate the degree of concentration with even greater accuracy.

Next, an electronic device 10 according to a Second Embodiment of the present disclosure will be described. The method used to calculate the degree of concentration in the Second Embodiment is different from that in the First Embodiment. Hereafter, the Second Embodiment will be described focusing on points that are different from in the First Embodiment. Parts having the same configuration as in the First Embodiment are denoted by the same reference symbols.

As illustrated in FIG. 1, the electronic device 10 according to the Second Embodiment includes an image-capturing unit 11, a line-of-sight detector 12, a memory 13, and a controller 14. The configurations and functions of the image-capturing unit 11, the line-of-sight detector 12, and the memory 13 in the Second Embodiment are the same as in the First Embodiment. The configuration of the controller 14 in the Second Embodiment is the same as in the First Embodiment.

In the Second Embodiment, the controller 14 estimates a low-concentration heat map group and a high-concentration heat map based on image IM, as in the First Embodiment. In the Second Embodiment, unlike in the First Embodiment, the controller 14 may calculate an integrated value of probabilities of the position PE corresponding to the line of sight LS for multiple continuously captured images IM for different load factors in multiple low-concentration heat maps $MP_{lc}$ respectively estimated based on the multiple images IM. The controller 14 may calculate an integrated value of probabilities of the position PE corresponding to the line of sight LS for each of multiple continuously captured images IM in multiple high-concentration heat maps respectively estimated based on the multiple images IM. The controller 14 may, for example, calculate integrated values for low-concentration heat map groups and high-concentration heat maps respectively corresponding to images IM of frames within a prescribed time interval backwards in time from the most recent image IM.

In the Second Embodiment, similarly to as in the First Embodiment, the controller 14 may calculate an integrated value for each low-concentration heat map group and high-concentration heat map by excluding, from among the multiple continuously captured images IM, images IM for which the movement speed of the line of sight LS is greater than or equal to a threshold.

In the Second Embodiment, unlike in the First Embodiment, the controller 14 may calculate the degree of concentration based on the integrated values respectively calculated for each low-concentration heat map group and high-concentration heat map, as described in the example below.

The controller 14 may select the heat map having the largest integrated value from among the low-concentration heat map group and the high-concentration heat map. In the Second Embodiment, the controller 14 may calculate the degree of concentration based on the reference value defined for the selected heat map, similarly to as in the First Embodiment. The reference value may be the same as or different from that in the First Embodiment.

In the Second Embodiment, similarly to as in the First Embodiment, when the selected heat map is a low-concentration heat map, the controller 14 may use a function or table to calculate the degree of concentration such that the degree of concentration has a smaller value as the calculated integrated value increases. In the Second Embodiment, similarly to as in the First Embodiment, when the selected heat map is a high-concentration heat map, the controller 14 may use a function or table to calculate the degree of concentration such that the degree of concentration has a larger value as the calculated integrated value increases.

The controller 14 may calculate the degree of concentration based on the integrated value in the high-concentration heat map and the integrated value in the low-concentration heat map having the largest integrated value in the low-concentration heat map group. The controller 14 may, for example, calculate the average of the reference value for the high-concentration heat map and the reference value for the low-concentration heat map MPic having the largest integrated value, the reference values being weighted in accordance with their respective integrated values, as the degree of concentration.

In the Second Embodiment, the controller 14 may output the calculated degree of concentration to the external device 17 similarly to as in the First Embodiment.

Figure 5:
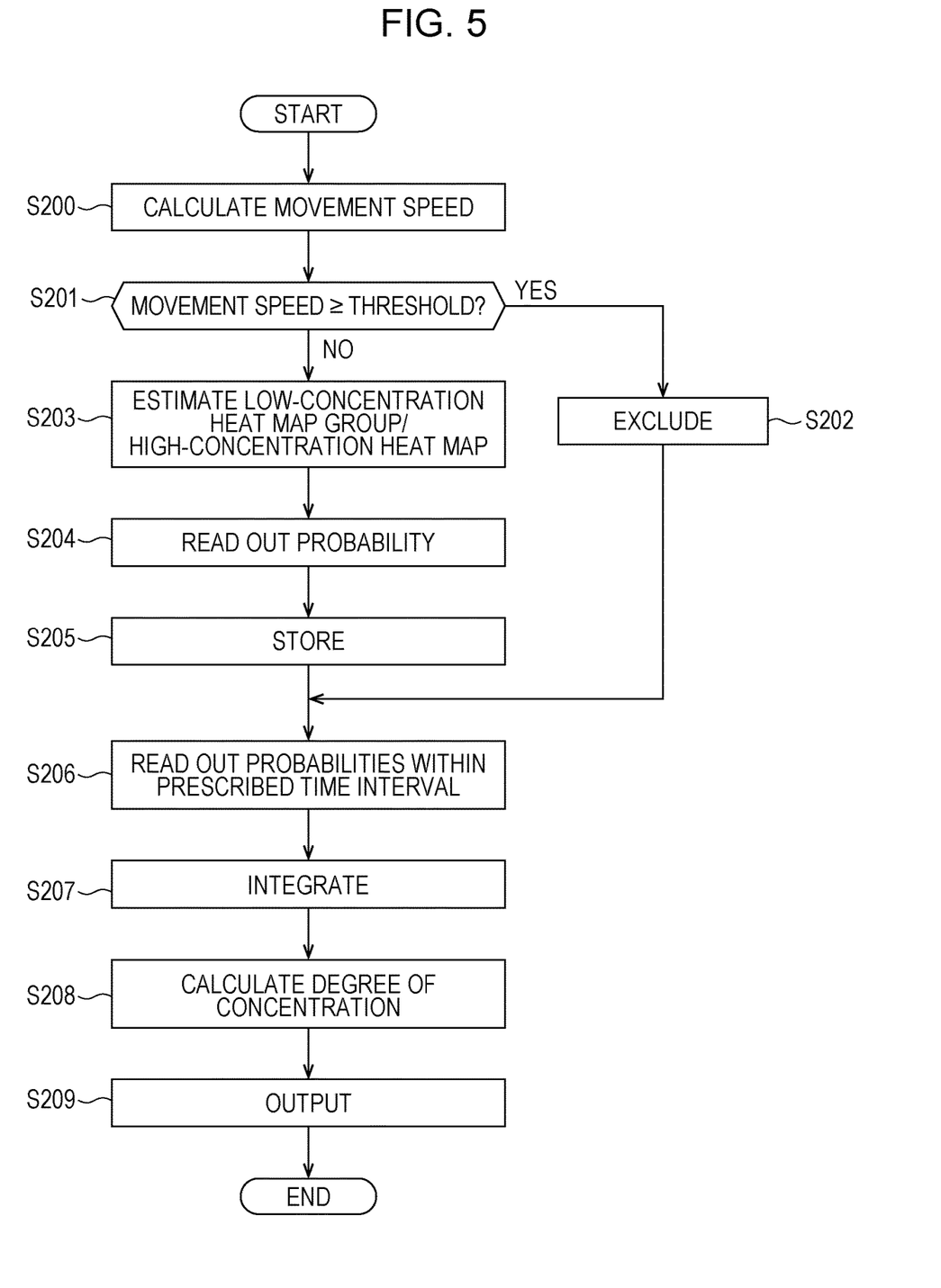
FIG. 5 is a flowchart for describing estimation processing performed by a controller in FIG. 1 in a Second Embodiment.

Next, estimation processing executed by the controller 14 in the Second Embodiment will be described using the flowchart in FIG. 5. The estimation processing starts whenever the controller 14 acquires an image IM of one frame and a line of sight LS.

In Step S200, the controller 14 calculates the movement speed of the acquired line of sight LS based on a comparison with a position PE of the line of sight LS acquired immediately previously. After the calculation, the process advances to Step S201.

In Step S201, the controller 14 determines whether the movement speed calculated in Step S200 is greater than or equal to a threshold. When the movement speed is greater than or equal to the threshold, the process advances to Step S202. When the movement speed is not greater than or equal to the threshold, the process advances to Step S203.

In Step S202, the controller 14 discards the image IM and the line of sight LS acquired at the start of the estimation processing. After the discarding, the process advances to Step S206.

In Step S203, the controller 14 estimates a low-concentration heat map group and a high-concentration heat map based on the image IM acquired at the start of the estimation processing. After the estimation, the process advances to Step S204.

In Step S204, the controller 14 reads out the probabilities of the position PE corresponding to the line of sight LS acquired at the start of the estimation processing in the low-concentration heat map group and the high-concentration heat map estimated in Step S203. After that, the process advances to Step S205.

In Step S205, the controller 14 stores the probabilities for the low-concentration heat map group and the high-concentration heat map identified in Step S204 in the memory 13. After storing the data, the process advances to Step S206.

In Step S206, the controller 14 reads out from the memory 13 the probabilities of the low-concentration heat map group and the high-concentration heat map based on multiple images IM acquired within a prescribed time interval backwards from the start of the estimation processing. After that, the process advances to Step S207.

In Step S207, the controller 14 calculates the integrated value by integrating the probabilities read out in Step S206 for each of the multiple low-concentration heat maps included in the low-concentration heat map group and the high-concentration heat map. After the integration, the process advances to Step 208.

In Step S208, the controller 14 calculates the degree of concentration based on the integrated value calculated in Step S207. After the calculation, the process advances to Step S209.

In Step S209, the controller 14 outputs the degree of concentration calculated in Step S208 to the external device 17. After the output, the estimation processing ends.

A variety of variations and amendments may be made to the content of the present disclosure based on the present disclosure by one skilled in the art. Therefore, note that such variations and amendments are included within the scope of the present disclosure. For example, in each embodiment, each functional part, each means, each step and so on can be added to other embodiments so long as there are no logical inconsistencies, or can be replaced with each functional part, each means, each step, and so on of other embodiments. In each embodiment, a plurality of each functional part, each means, each step, and so on can be combined into a single functional part, means, or step or divided into multiple functional parts, means, or steps. Each of the above-described embodiments of the present disclosure is not limited to faithful implementation of each of the described embodiments, and may be implemented by combining or omitting some of the features as appropriate.

Figure 6:
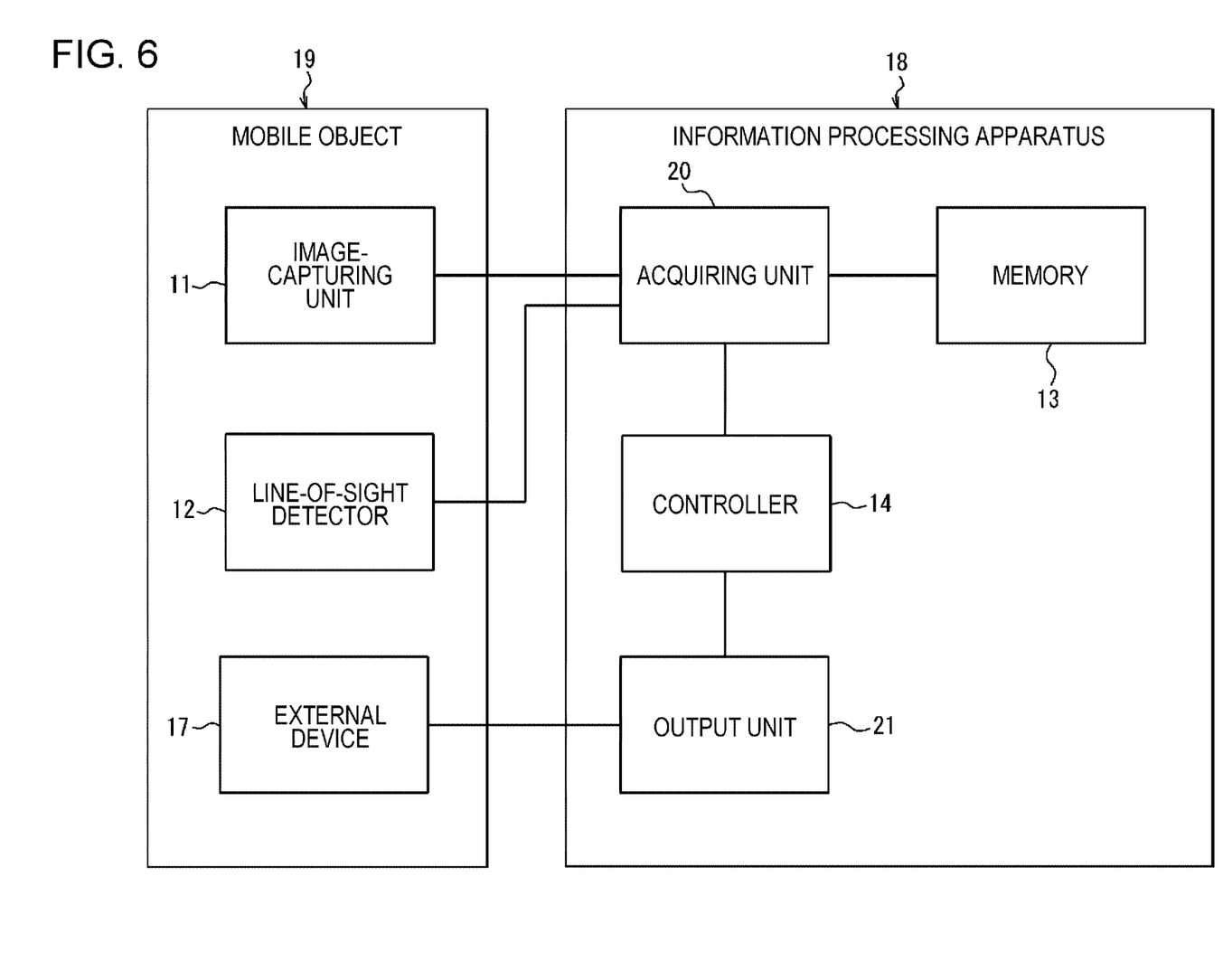
FIG. 6 is a block diagram illustrating an outline configuration of an information processing apparatus, which is a variation of the First Embodiment and the Second Embodiment.

In the First Embodiment and the Second Embodiment, the electronic device 10 includes the image-capturing unit 11 and the line-of-sight detector 12, and the controller 14 acquires an image IM and a line of sight LS to use in estimating the degree of concentration, but this configuration does not need to be adopted. As illustrated in FIG. 6, for example, an information processing apparatus 18, such as a cloud server, may estimate the degree of concentration based on the image IM and the line of sight LS, similarly to the electronic device 10. In such a configuration, the information processing apparatus 18 may acquire the image IM and the line of sight LS as information from a mobile object 19, in which the image-capturing unit 11 and the line-of-sight detector 12 are installed, via an acquiring unit 20. The information processing apparatus 18 may output the estimated degree of concentration via an output unit 21 to an external device 17 of the mobile object 19.

Many aspects of the content of the present disclosure are presented as a series of operations executed by a computer system or other hardware capable of executing program instructions. Computer systems and other hardware include, for example, general-purpose computers, personal computers (PCs), dedicated computers, workstations, personal communications system (PCS), mobile (cellular) telephones, mobile telephones with data processing capabilities, RFID receivers, games consoles, electronic notepads, laptop computers, global positioning system (GPS) receivers or other programmable data processing devices. Note that in each embodiment, various operations are performed by dedicated circuits (for example, individual logic gates interconnected to perform specific functions) implemented using program instructions (software), or by logic blocks or program modules executed by one or more processors. Examples of "one or more processors that execute logic blocks or program modules" may include one or more microprocessors, a central processing unit (CPU), an application specific integrated circuit (ASIC), a digital signal processor (DSP), a programmable logic device (PLD), a field programmable gate array (FPGA), a processor, a controller, a microcontroller, a microprocessor, an electronic device, or another device designed to perform the functions described herein, and/or any combination of these. The embodiments described herein are implemented, for example, using hardware, software, firmware, middleware, microcode, or any combination of these. Instructions may be program code or code segments for performing the required tasks. The instructions can be stored in a machine-readable non-transitory storage medium or another medium. Code segments may represent any combination of procedures, functions, subprograms, programs, routines, subroutines, modules, software packages, classes or instructions, data structures or program statements. Code segments transmit and/or receive information, data arguments, variables or stored content from and/or to other code segments or hardware circuits, and in this way, connect to other code segments or hardware circuits.

Machine-readable non-transitory storage media can be further configured as computer-readable physical carriers (media) configured as the categories of solid state memory, magnetic disks and optical disks, and an appropriate set of computer instructions such as program modules for causing a processor to perform the techniques disclosed herein and data structures are stored on such media. Computer-readable media include electrical connections with one or more wiring lines, magnetic disk storage media, magnetic cassettes, magnetic tapes, other magnetic and optical storage devices (for example, compact disks (CDs), laser disks, and digital versatile discs (DVDs), floppy disks and Blu-ray disks, portable computer disks, random access memory (RAM), read-only memory (ROM), rewritable programmable ROM such as EPROM, EEPROM, or flash memory, or other physical storage media capable of storing information, or a combination of any of these media. Memory can be provided inside and/or outside the processor/processing unit. As used herein, the term "memory" refers to any type of long-term or short-term storage, volatile, nonvolatile, or other memory, and the term does not limit the specific type or number of memories or the type of medium in which data is stored.

Note that a system is disclosed herein as having various modules and/or units that perform specific functions. These modules and units are illustrated in a schematic manner in order to briefly illustrate their functionality and do not necessarily represent specific hardware and/or software. In that sense, these modules, units, and other components may be hardware and/or software implemented to substantially perform the specific functions described herein. The various functions of the different components may be any combination of hardware and/or software or hardware and/or software used separately from each other, and can be used separately or in any combination. In addition, input/output or I/O devices or user interfaces, including but not limited to keyboards, displays, touch screens, pointing devices, and so forth, can be connected directly to the system or via an I/O controller interposed therebetween. Thus, various aspects of the contents of the present disclosure can be implemented in numerous different ways, all of which are included within the scope of the present disclosure.

REFERENCE SIGNS

10 electronic device
11 image-capturing unit
12 line-of-sight detector
13 memory
14 controller
15 low-concentration heat map group estimator
16 high-concentration heat map estimator
17 external device
18 information processing apparatus
19 mobile object
20 acquiring unit
21 output unit
IM image
LS line of sight
$MP_{lc}$ low-concentration heat map
PE position corresponding to direction of line of sight

The invention claimed is:

1. An electronic device comprising:
   an image-capturing unit configured to generate an image corresponding to a view by performing image capturing;
   a line-of-sight detector configured to detect a line of sight of a subject with respect to the view; and
   a controller configured to estimate a degree of concentration of the subject based on the image and the line of sight,
   wherein the controller functions as a low-concentration heat map group estimator constructed based on learning data obtained by machine learning a relationship between a learning image and a line of sight to the learning image when a load that reduces concentration of a learning subject acts on the learning subject for each of multiple load factors and capable of estimating, based on the image, a low-concentration heat map group representing, for each of the load factors, a probability of the line of sight being at each position within the image when the load is acting, and functions as a high-concentration heat map estimator constructed based on learning data obtained by machine learning a relationship between a learning image and a line of sight to the learning image when the load acting on the learning subject is removed or when the load is reduced and capable of estimating, based on the image, a high-concentration heat map representing a probability of the line of sight being at each position within the image when the load is removed or when the load is reduced, and estimates a degree of concentration of the subject based on the low-concentration heat map group, the high-concentration heat map, and the line of sight of the subject.

2. The electronic device according to claim 1, wherein when a heat map with a highest probability at a position corresponding to the line of sight of the subject among the low-concentration heat map group and the high-concentration heat map is one of the low-concentration heat maps within the low-concentration heat map group, the controller outputs a load factor corresponding to that low-concentration heat map together with the degree of concentration.

3. The electronic device according to claim 1, wherein the controller calculates the degree of concentration of the subject based on a plurality of the images, which are continuously captured.

4. The electronic device according to claim 3, wherein the controller calculates the degree of concentration of the subject by excluding, from among the plurality of continuously captured images, images for which a speed of movement of the line of sight of the subject with respect to the images exceeds a threshold.

5. An information processing apparatus comprising:
an acquiring unit configured to acquire an image corresponding to a view and a line of sight of a subject to the view;
a controller configured to estimate a degree of concentration of the subject based on the image and the line of sight; and
an output unit configured to output the degree of concentration,
wherein the controller functions as a low-concentration heat map group estimator constructed based on learning data obtained by machine learning a relationship between a learning image and a line of sight to the learning image when a load that reduces concentration of a learning subject acts on the learning subject for each of multiple load factors and capable of estimating, based on the image, a low-concentration heat map group representing, for each of the load factors, a probability of the line of sight being at each position within the image when the load is acting, and functions as a high-concentration heat map estimator constructed based on learning data obtained by machine learning a relationship between a learning image and a line of sight to the learning image when the load acting on the learning subject is removed or when the load is reduced and capable of estimating, based on the image, a high-concentration heat map representing a probability of the line of sight being at each position within the image when the load is removed or when the load is reduced, and estimates the degree of concentration of the subject based on the low-concentration heat map group, the high-concentration heat map, and the line of sight of the subject.

6. A non-transitory computer-readable recording medium including a degree-of-concentration calculation program configured to cause a computer to function as:
an image-capturing unit configured to generate an image corresponding to a view by performing image capturing;
a line-of-sight detector configured to detect a line of sight of a subject with respect to the view; and
a controller configured to estimate a degree of concentration of the subject based on the image and the line of sight,
wherein the controller functions as a low-concentration heat map group estimator constructed based on learning data obtained by machine learning a relationship between a learning image and a line of sight to the learning image when a load that reduces concentration of a learning subject acts on the learning subject for each of multiple load factors and capable of estimating, based on the image, a low-concentration heat map group representing, for each of the load factors, a probability of the line of sight being at each position within the image when the load is acting, and functions as a high-concentration heat map estimator constructed based on learning data obtained by machine learning a relationship between a learning image and a line of sight to the learning image when the load acting on the learning subject is removed or when the load is reduced and capable of estimating, based on the image, a high-concentration heat map representing a probability of the line of sight being at each position within the image when the load is removed or when the load is reduced, and estimates a degree of concentration of the subject based on the low-concentration heat map group, the high-concentration heat map, and the line of sight of the subject.

7. A degree-of-concentration calculation method comprising:
generating an image corresponding to a view by performing image capturing;
detecting a line of sight of a subject to the view; and
estimating a degree of concentration of the subject based on the image and the line of sight,
wherein the estimating is constructed based on learning data obtained by machine learning a relationship between a learning image and a line of sight to the learning image when a load that reduces concentration of the learning subject acts on the learning subject for each of multiple load factors and is capable of estimating, based on the image, a low-concentration heat map group representing, for each of the load factors, a probability of the line of sight being at each position within the image when the load is acting, and the estimating is constructed based on learning data obtained by machine learning a relationship between a learning image and a line of sight to the learning image when the load acting on the learning subject is removed or when the load is reduced and is capable of estimating, based on the image, a high-concentration heat map representing the probability of the line of sight being at each position within the image when the load is removed or when the load is reduced, and the estimating estimates a degree of concentration of the subject based on the low-concentration heat map group, the high-concentration heat map, and the line of sight of the subject.

8. A computer training method that allows machine learning of a relationship between a learning image and a line of sight to the learning image when a load that reduces concentration of a learning subject acts on the learning subject for each of multiple load factors, allows machine learning of a relationship between a learning image and a line of sight to the learning image when the load acting on the learning subject is removed or when the load is reduced, and thereby allows estimation, based on an arbitrary image, of a low-concentration heat map group representing, for each of the multiple load factors, a probability of the line of sight being at each position within the image when the load is acting, and a high-concentration heat map representing a probability of the line of sight being at each position within the image when the load is removed.

* * * * *